United States Patent [19]
Hewko

[11] 3,892,135
[45] July 1, 1975

[54] SPEEDOMETER DRIVE ARRANGEMENT

[75] Inventor: Lubomyr O. Hewko, Port Clinton, Ohio

[73] Assignee: General Motors Corporation, Detroit, Mich.

[22] Filed: June 13, 1974

[21] Appl. No.: 478,843

[52] U.S. Cl. .................... 74/12; 74/198; 74/798
[51] Int. Cl. ... F16h 37/00; F16h 15/08; F16h 13/06
[58] Field of Search .................. 74/198, 12, 798

[56] References Cited
UNITED STATES PATENTS 3,097,539   7/1963   Opocensky .................... 74/198
3,727,473   4/1973   Bayer .......................... 74/198

Primary Examiner—Leonard H. Gerin
Attorney, Agent, or Firm—John P. Moran

[57] ABSTRACT

A continuously variable speedometer drive arrangement including a traction drive-ball or barrel confined in a preloaded manner between the transmission output shaft and a disc of a planetary unit associated with the speedometer take-off shaft, wherein the radius from the take-off shaft axis to the center of the drive-ball or barrel may be changed via rotary adjustment means.

5 Claims, 5 Drawing Figures

SPEEDOMETER DRIVE ARRANGEMENT

This invention relates generally to automotive speedometer drive arrangements and, more particularly, to a continuously variable drive means therefor.

Generally, automotive speedometers are driven from the transmission output shaft by a pair of crossed-axis gears and a flexible cable. Because a pair of gears has only one finite drive ratio, it is necessary to use different gears for each of countless combinations of tire sizes and axle ratios, with the attendant production and service difficulties of having to maintain a large gear inventory. Additionally, because of normal tire wear and dimensional tolerances of tire diameters, the resultant speed indicated by a conventional speedometer, can be in error.

Currently, drive ratio adjustment is not generally available, and yet speedometer accuracy requirements are becoming increasingly more stringent and, hence, extremely difficult to maintain over the life-time of an automobile.

Accordingly, a general object of the invention is to provide an improved speedometer drive arrangement wherein initial and periodic adjustment of the transmission output shaft to speedometer take-off shaft speed ratio is readily and accurately accomplished.

Another object of the invention is to provide an infinitely or continuously variable speedometer drive arrangement which is frictionally driven by the transmission output shaft and permits adjustment of the speed ratio between the transmission output shaft and the speedometer power take-off shaft, particularly during final test of the automobile on a roll dynamometer, for example, at the end of an assembly line. Thus, the speed ratio would be adjusted for the exact axle ratio and tire size as installed in the specific vehicle. The accuracy of speed indication thus established could be maintained during the life of the automobile through periodic adjustments of the inventive continuously variable drive arrangement.

A further object of the invention is to provide a continuously variable traction-drive arrangement operatively connected to the transmission output shaft for driving a speedometer take-off shaft, wherein the speed ratio of the transmission output shaft and speedometer take-off shaft may be varied by a simple rotational adjustment operation.

Still another object of the invention is to provide a speedometer take-off housing rotatably mounted on a transmission extension housing and having an off-set opening formed therein, with the speedometer take-off shaft rotatably mounted in the off-set opening, and a drive-ball or barrel mounted in a traction-drive or frictional-drive relationship between the transmission output shaft and a planetary arrangement operatively connected to a flange formed on the end of the take-off shaft, the resultant speed ratio being variable by manually rotating the speedometer take-off housing to thereby vary the distance or radius between the axis of the take-off shaft and the center of the drive-ball as required for an accurate reading on the speedometer for various tire size and axle ratio combinations.

These and other objects and advantages of the invention will be apparent when reference is made to the following description and accompanying drawings, wherein.

Figure 1:
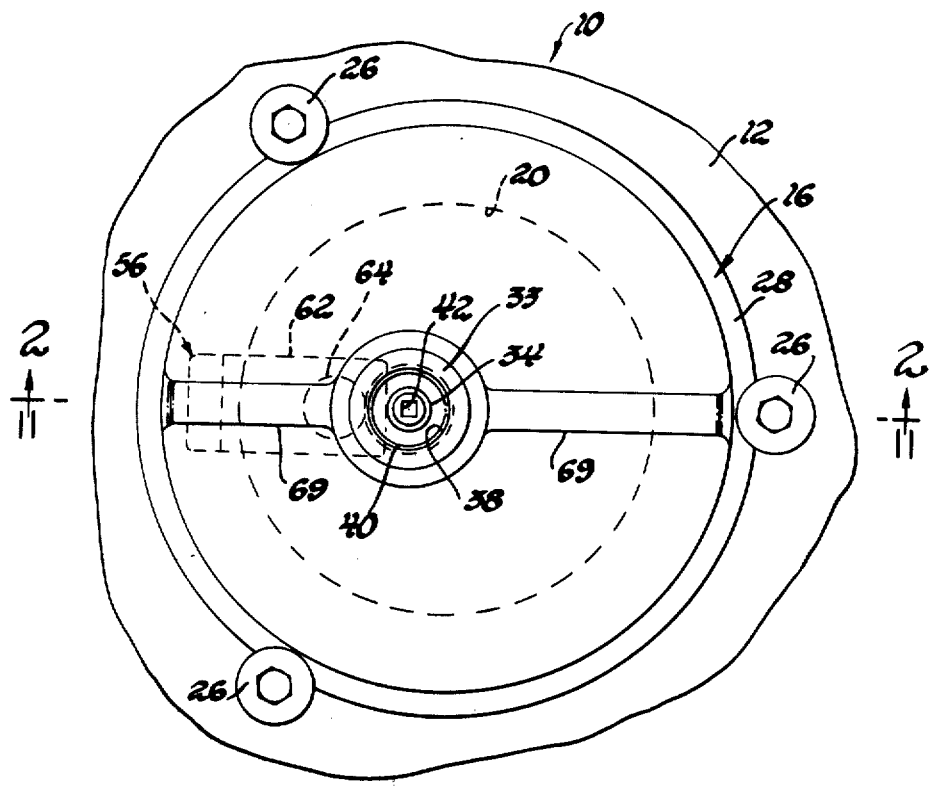
FIG. 1 is a fragmentary top view of an automotive transmission case embodying the invention.
Figure 2:
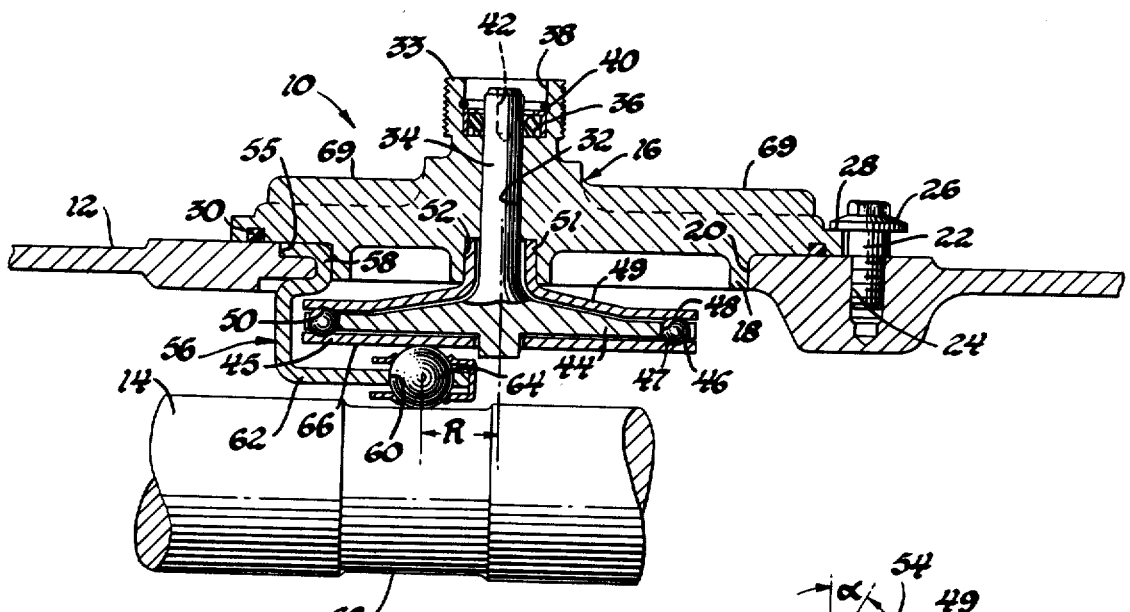
FIG. 2 is a cross-sectional view taken along the plane of line 2—2 of FIG. 1, and looking in the direction of the arrows.

Referring now to the drawings in greater detail, FIGS. 1 and 2 illustrate an accessory transmission 10, such as a vehicular speedometer drive arrangement, adapted to being mounted in a vehicular transmission extension housing or case 12 for use with a transmission output shaft 14, or other drive shafts, such as a transmission governor shaft, axle shaft, and the like.

The transmission 10 includes an eccentric housing 16 having a guide ring 18 rotatably mounted in a side opening 20 formed in the transmission case 12. The housing 16 is retained against the transmission case 12 by any suitable means, such as screws 22 threadedly mounted in threaded openings 24 formed in the case 12, each screw 22 having a collar 26 formed thereon for tightening down on a flange 28 formed around the outer periphery of the housing 16. An O-ring seal 30 prevents leakage of transmission fluid between the face of the flange 28 and the adjacent outer surface of the case 12. An off-center opening 32, serving as a bearing surface, is formed through an extension 33 formed on the housing 16.

A shaft 34, such as a speedometer take-off shaft, is mounted through the off-center opening 32, and is rotatably supported by the latter bearing surface 32 inside a counterbore 38 formed in the housing 16 at the exposed end of the opening 32. A seal 36 is retained axially by a retainer ring 40. Suitable fitting means, such as a square or hexagonal opening 42, is formed in the exposed end of the take-off shaft 34 for the connection therewith of a conventional speedometer cable [not shown].

A flange 44 of a predetermined diameter is formed on the end of the take-off shaft 34 within the transmission case 12. A disc 45 is freely mounted around the end of the shaft 34, adjacent the flange 44, with a plurality of balls 46 mounted in an annular groove 47 formed in the disc 45. The balls 46 are also confined in spaced slots 48 formed around the outer periphery of the flange 44. A contoured resilient wall 49 is formed to include an annular groove 50 serving as a track for the balls 46, with a sleeve-like extension 51 being formed at the center of the wall 49 and secured in a counterbore 52 formed in the housing 16 at the inner end of the opening 32. Thus it may be realized that the disc 45, the balls 46, the flange 44, and the wall 49 serve as a ring, planets, a carrier, and reaction sun, respectively, of a planetary unit which provides a 2:1 speed reduction between the input at the ring 45 and the output at the carrier 44 and the latter's associated output shaft 34.

Figure 2A:
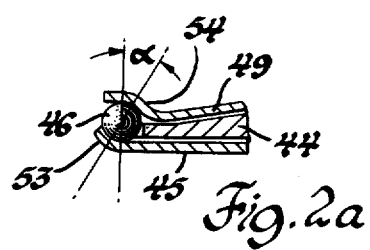
FIG. 2a is a fragmentary cross-sectional view of a modification of a portion of the FIG. 2 structure.

Such 2:1 speed reduction may be varied somewhat for better stability and/or a different resultant speed ratio range by the formation of selected contoured ends 53 and 54 (FIG. 2a) on the respective outer portions of the disc 45 and the resilient wall 49, providing an angle α therebetween, which may, of course, be formed in either direction.

A stepped recess 55 is formed in the case 12 at a predetermined location around the side opening 20. A reaction member 56 includes a hook-like end-portion 58 for confinement in the stepped recess 55 of the transmission case 12 adjacent the guide ring 18. An opening 60, formed in a radially inwardly extending portion 62 of the reaction member 56, serves as a socket for operatively retaining a traction drive-ball 64 between the adjacent outer surface 66 of the disc or ring 45 and the transmission output shaft 14 at a predetermined peripheral surface 68 thereof. The traction drive member 64 is shown as a ball; however, if desired, a barrel roller could be substituted for the drive-ball 64.

Operation

The traction drive-ball 64 is preloaded with respect to the peripheral surface 68 of the transmission output shaft 14 by virtue of the resilient wall 49 being sprung upwardly when mounted on the ball planets 46, once the guide ring 18 of the eccentric housing 16 is lowered into the opening 20. The preloaded drive-ball 64 is thus frictionally confined for rotation between the surfaces 66 and 68 while retained in the socket or opening 60 formed in the extension 62 of the reaction member 56. The speed ratio of the rotary speed of the transmission output shaft 14 and that of the speedometer take-off shaft 34 is dependent upon the distance or radius between the axis of the shaft 34 and the center of the drive-ball 64, i.e., the distance designated by the letter R in FIG. 2. Such distance R, and hence, the resultant speed ratio of the transmission 10, as required for particular combinations of tire sizes and axle ratios, is variable between predetermined limits by loosening the screws 22 and manually rotating the housing 16 in the opening 20, thereby moving the axis of the take-off shaft 34 with respect to the fixed center of the traction drive-ball 64. A pair of oppositely disposed ribs or handles 69 are formed on the top of the housing 16 to facilitate the manual rotation of the housing 16.

It has been determined that substantially all current axle-ratio tire-size combinations could be compensated for if the adjustment features assure a speed ratio range of from 1.8:1 to 3.5:1 reduction, and such range is readily attainable with the inventive drive arrangement described above when the variable radius R function is combined with the 2:1 speed reduction available from the above-described planetary arrangement.

Figure 3:
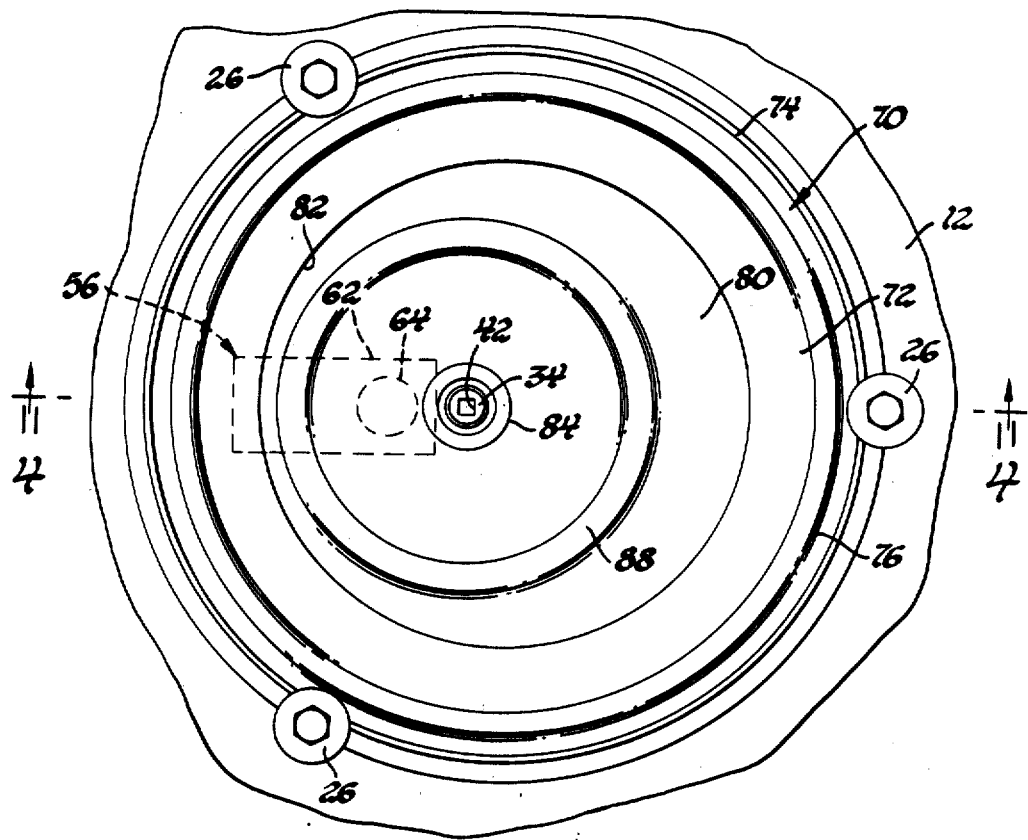
FIG. 3 is a fragmentary top view of an automotive transmission case embodying an alternate embodiment of the invention.
Figure 4:
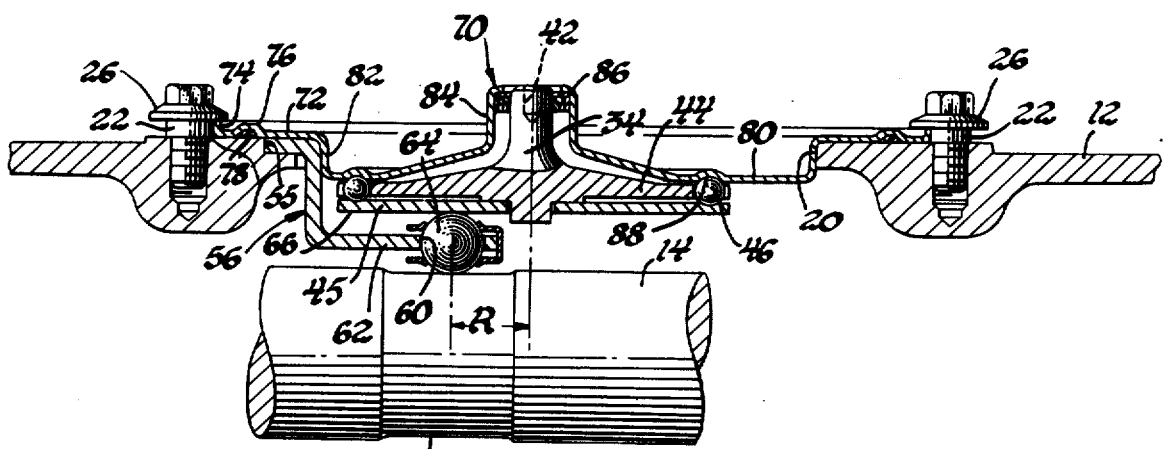
FIG. 4 is a cross-sectional view taken along the plane of line 4—4 of FIG. 3, and looking in the direction of the arrows.

The alternate embodiment shown in FIGS. 3 and 4 is similar to the embodiment of FIGS. 1 and 2, except that the housing 16 and the contoured resilient wall 49 and the sleeve-like extension 51 of the latter embodiment are replaced by a resilient housing 70. The housing 70 includes a mounting surface 72 which is retained against the outer surface of the transmission case 12 by virtue of the collars 26 of the screws 22 being tightened against a cylindrical ring 74 formed around the outer periphery of the mounting surface 72. An annular groove 76 is formed in the mounting surface 72 suitable for the mounting therein of an O-ring seal 78.

A central portion 80 of the housing 70 is off-set from the plane of the mounting surface 72 by the formation of a sleeve-portion 82 (FIG. 4) at the inner periphery of the surface 72 for the insertion in the side opening 20 formed in the transmission case 12. Another sleeve-portion 84 is formed in the central portion 80, off-set a predetermined amount from the center thereof. The speedometer take-off shaft 34 extends through the sleeve-portion 84, sealed therein by a suitable seal 86.

The central portion 80 is contoured such that it is forced outwardly by the ball planets 46 which abut against an annular groove 88 formed in the central portion. The resistance offered by the central portion 80 serves to assure a friction- or traction-type drive relationship among the drive-ball 64 and the adjacent surfaces 66 and 68, as discussed above relative to the FIGS. 1 and 2 embodiment.

It should be apparent that the invention provides an improved continuously variable speedometer drive arrangement wherein conventional gears and resultant gear noise have been eliminated and wherein adjustment may be readily and accurately accomplished to compensate for various axle-ratio tire-size combinations, or for subsequent tire wear or size changes.

While but two embodiments of the invention have been shown and described, other modifications thereof are possible.

I claim:

1. A continuously variable speedometer drive arrangement comprising a stationary housing, a drive shaft rotatably mounted in said stationary housing, an opening formed in a side of said stationary housing, a speedometer drive housing movably mounted on said stationary housing, guide means formed on said speedometer drive housing and mounted in said opening, fastener means for securing said speedometer drive housing on said stationary housing, speedometer take-off shaft mounting means formed on said speedometer drive housing off-set from the center of said housing, a speedometer take-off shaft rotatably mounted in said take-off shaft mounting means, a belleville spring-type planetary unit operatively connected to said speedometer take-off shaft and to said speedometer drive housing, a reaction member connected to said stationary housing, and a drive-member rotatably mounted on said reaction member and maintained by said belleville spring-type planetary unit in a driving relationship intermediate said drive shaft and said speedometer take-off shaft, the distance between the center of the drive-member and the axis of said take-off shaft being variable in response to manual movement of said guide means in said opening in said stationary housing causing said take-off shaft to move with respect to said drive-member.

2. A continuously variable speedometer drive arrangement comprising a transmission extension housing, a transmission output shaft extending through said extension housing, a circular opening formed in a side of said extension housing, a speedometer drive housing rotatably mounted on said extension housing, a guide ring formed on said speedometer drive housing and mounted in said circular opening, fastener means for securing said speedometer drive housing on said extension housing, a speedometer take-off shaft opening formed through said speedometer drive housing off-set from the center of said housing, a speedometer take-off shaft rotatably mounted in said take-off shaft opening, a flange formed on an end of said take-off shaft within said extension housing, a belleville spring-type race and planet assembly operatively connected to said flange and to said speedometer drive housing, a reaction member connected to said extension housing, and a drive-member rotatably mounted on said reaction member and maintained by said belleville spring-type race and planet assembly in a driving relationship between said transmission output shaft and said flange, the distance between the center of said drive-member and the axis of said take-off shaft being variable in response to manual rotation of said guide ring in said circular opening in said extension housing causing said take-off shaft to move with respect to said drive-member.

3. A continuously variable speedometer drive arrangement comprising a transmission extension housing, a transmission output shaft extending through said extension housing, a circular opening formed in a side of said extension housing, a speedometer drive housing rotatably mounted on said extension housing, a guide ring formed on said speedometer drive housing and mounted in said circular opening, fastener means for securing said speedometer drive housing on said extension housing, a speedometer take-off shaft opening formed through said speedometer drive housing off-set from the center of said housing, a speedometer take-off shaft rotatably mounted in said take-off shaft opening, a flange-type carrier formed on an end of said take-off shaft within said extension housing, a plurality of ball planets mounted circumferentially around said carrier, a belleville spring-type upper race and a rigid bottom race mounted respectively above and below said ball planets, said upper race being secured at the center portion thereof to said speedometer drive housing and said rigid bottom race being free to rotate independently, a reaction member connected to said extension housing and having an opening formed therein, and a drive-ball rotatably mounted in said opening of said reaction member and maintained by said belleville spring-type upper race in a traction-drive relationship between said transmission output shaft and said rigid bottom race, the distance between the center of said drive-ball and the axis of said take-off shaft being variable in response to manual rotation of said guide ring in said circular opening in said extension housing.

4. A continuously variable speedometer drive arrangement comprising a transmission extension housing, a transmission output shaft extending through said extension housing, a circular opening formed in a side of said extension housing, a speedometer drive housing rotatably mounted on said extension housing, a guide ring formed on said speedometer drive housing and mounted in said circular opening, fastener means for securing said speedometer drive housing on said extension housing, a speedometer take-off shaft opening formed through said speedometer drive housing off-set from the center of said housing, a speedometer take-off shaft rotatably mounted in said take-off shaft opening, a flange-type carrier formed on an end of said take-off shaft within said extension housing, a plurality of ball planets mounted circumferentially around said carrier, a belleville spring-type upper race and a rigid bottom race mounted respectively above and below said ball planets, said upper race being secured at the center portion thereof to said speedometer drive housing and said rigid bottom race being free to rotate independently, first and second annular grooves formed respectively in said upper and bottom races serving as paths for said ball planets wherein the diameter of one of said grooves is smaller than the diameter of the other of said grooves effecting a variation in the resultant speed ratio therebetween, a reaction member connected to said extension housing and having an opening formed therein, and a drive-ball rotatably mounted in said opening of said reaction member and maintained by said belleville spring-type upper race in a traction-drive relationship between said transmission output shaft and said rigid bottom race, the distance between the center of said drive-ball and the axis of said take-off shaft being variable in response to manual rotation of said guide ring in said circular opening in said extension housing.

5. A continuously variable speedometer drive arrangement comprising a transmission extension housing, a transmission output shaft extending through said extension housing, a circular opening formed in a side of said extension housing, a speedometer drive housing rotatably mounted on said extension housing, a guide ring formed on said speedometer drive housing and mounted in said circular opening, a speedometer take-off shaft opening formed through said speedometer drive housing off-set from the center of said housing, a speedometer take-off shaft rotatably mounted in said take-off shaft opening, a flange-type carrier formed on an end of said take-off shaft within said extension housing, a plurality of ball planets mounted circumferentially around said carrier, a belleville spring-type central portion formed integrally on said speedometer drive housing and in rolling contact with said ball planets, a rigid bottom race mounted for independent rotation on said ball planets on the side thereof opposite said integral center portion, a reaction member connected to said extension housing and having an opening formed therein, and a drive-ball rotatably mounted in said opening of said reaction member in a traction-drive relationship between said transmission output shaft and said bottom race, the distance between the center of said drive-ball and the axis of said take-off shaft being variable in response to manual movement of said guide ring in said circular opening in said extension housing.

* * * * *